United States Patent
Ohnishi et al.

(10) Patent No.: US 10,950,048 B2
(45) Date of Patent: Mar. 16, 2021

(54) COMPUTER-READABLE NON-TRANSITORY STORAGE MEDIUM HAVING STORED THEREIN INFORMATION PROCESSING PROGRAM, INFORMATION PROCESSING SYSTEM, INFORMATION PROCESSING METHOD, AND INFORMATION PROCESSING APPARATUS

(71) Applicant: NINTENDO CO., LTD., Kyoto (JP)

(72) Inventors: Naonori Ohnishi, Kyoto (JP); Hiroaki Hiruma, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 704 days.

(21) Appl. No.: 15/213,653

(22) Filed: Jul. 19, 2016

(65) Prior Publication Data

US 2017/0249784 A1 Aug. 31, 2017

(30) Foreign Application Priority Data

Feb. 25, 2016 (JP) .............................. JP2016-034704

(51) Int. Cl.
| | | |
|---|---|---|
| *G06T 15/00* | (2011.01) | |
| *G06T 19/00* | (2011.01) | |
| *G06F 3/0481* | (2013.01) | |
| *G06F 3/0488* | (2013.01) | |
| *G06T 19/20* | (2011.01) | |
| *G06F 3/0484* | (2013.01) | |
| *A63F 13/426* | (2014.01) | |
| *A63F 13/2145* | (2014.01) | |

(52) U.S. Cl.
CPC .......... *G06T 19/003* (2013.01); *G06F 3/0488* (2013.01); *G06F 3/04815* (2013.01); *G06F 3/04845* (2013.01); *G06T 19/20* (2013.01); *A63F 13/2145* (2014.09); *A63F 13/426* (2014.09); *G06T 2219/2016* (2013.01)

(58) Field of Classification Search
CPC ........... G06T 19/003; G06T 2219/2016; G06T 19/20; G06F 3/04845; G06F 3/04815; G06F 3/0488; A63F 13/2145; A63F 13/426
USPC ......................................................... 345/419
See application file for complete search history.

(56) References Cited

U.S. PATENT DOCUMENTS

| | | | |
|---|---|---|---|
| 5,019,809 A | 5/1991 | Chen | |
| 7,286,119 B2 * | 10/2007 | Yamaguchi | G06F 3/04815 345/156 |

(Continued)

FOREIGN PATENT DOCUMENTS

JP  2004-259063  9/2004

OTHER PUBLICATIONS

Extended European Search Report dated Jul. 25, 2017 issued in corresponding European Application No. 16180082.6 (8 pgs.).

*Primary Examiner* — Phu K Nguyen
(74) *Attorney, Agent, or Firm* — Nixon & Vanderhye P.O.

(57) ABSTRACT

An image of a virtual three-dimensional space in which a three-dimensional object is positioned is displayed. A first straight line is calculated on the basis of predetermined two points in the three-dimensional object, and a second straight line orthogonal to the first straight line is further calculated. Then, either one of the first straight line and the second straight line is selected as a rotation axis on the basis of an input performed with the pointing device, and the three-dimensional object is rotated about the rotation axis.

15 Claims, 7 Drawing Sheets

(56) References Cited

U.S. PATENT DOCUMENTS

| | | | | |
|---|---|---|---|---|
| 7,330,198 B2* | 2/2008 | Yamaguchi | ......... | G06F 3/04845 |
| | | | | 345/650 |
| 7,568,171 B2* | 7/2009 | Boylan | ............... | G06F 3/04815 |
| | | | | 345/653 |
| 8,334,028 B2* | 12/2012 | Nagata | ................. | G11B 5/8408 |
| | | | | 427/130 |
| 9,310,092 B2* | 4/2016 | Chapman | ............... | F24F 11/006 |
| 9,594,487 B2* | 3/2017 | Schmidt | ............. | G06F 3/04815 |
| 9,696,842 B2* | 7/2017 | Algreatly | ............. | G06F 3/0416 |
| 9,824,485 B2* | 11/2017 | Vesely | .................... | G06T 15/20 |
| 2004/0164956 A1 | 8/2004 | Yamaguchi et al. | | |
| 2004/0164957 A1 | 8/2004 | Yamaguchi et al. | | |

* cited by examiner

COMPUTER-READABLE NON-TRANSITORY STORAGE MEDIUM HAVING STORED THEREIN INFORMATION PROCESSING PROGRAM, INFORMATION PROCESSING SYSTEM, INFORMATION PROCESSING METHOD, AND INFORMATION PROCESSING APPARATUS

CROSS REFERENCE TO RELATED APPLICATION

The disclosure of Japanese Patent Application No. 2016-034704, filed on Feb. 25, 2016, is incorporated herein by reference.

FIELD

The exemplary embodiments relate to information processing of operating a three-dimensional object on the basis of an input performed with a pointing device, and more particularly relates to a process of rotating a three-dimensional object displayed on a screen.

BACKGROUND AND SUMMARY

Hitherto, a display processing apparatus for a three-dimensional object is known. Also, a display processing apparatus that uses an operation of a dial type input device in order to rotate or move a displayed three-dimensional object, is known. In such a display processing apparatus, any one of an x axis, a y axis, and a z axis in a virtual three-dimensional space is selected as a rotation axis on the basis of an operation of pressing the dial type input device. Then, the three-dimensional object is rotated about the selected rotation axis on the basis of the rotation direction and the rotation amount of an operation of rotating the dial type input device.

In the above display processing apparatus, in accordance with a single operation of pressing the dial type input device, the x axis, the y axis, and the x axis in the virtual three-dimensional space are switched in a predetermined order, and a rotation axis is selected. Therefore, there is an aspect that it is difficult to perform an intuitive rotation operation. In addition, three axes that can be selected as a rotation axis are axes fixed as an x axis, a y axis and a z axis in a three-dimensional virtual space. Therefore, there is also an aspect that the flexibility in rotation of the three-dimensional object is insufficient.

Therefore, it is an object of the exemplary embodiments to provide an information processing program and the like which enable an intuitive rotation operation regarding an operation of rotating a displayed three-dimensional object, and enable flexible rotation of the three-dimensional object.

In order to attain the object described above, the following configuration examples are exemplified.

A configuration example is directed to a computer-readable non-transitory storage medium having stored therein an information processing program executed by a computer of an information processing apparatus capable of receiving an input performed with a pointing device, the information processing program causing the computer to execute: positioning a three-dimensional object in a virtual three-dimensional space; displaying a three-dimensional image obtained by capturing the virtual three-dimensional space with a virtual camera, on a screen; calculating a first straight line on the basis of predetermined two points in the three-dimensional object; calculating a second straight line orthogonal to the first straight line; selecting either one of the first straight line and the second straight line as a rotation axis on the basis of an input performed with the pointing device; and rotating the three-dimensional object about the selected rotation axis.

According to the above configuration example, regarding an operation for rotating the three-dimensional object, intuitive operability can be provided.

In another configuration example, the information processing program may further cause the computer to execute: calculating a third straight line which is a straight line obtained by projecting the first straight line onto a predetermined plane; and calculating a fourth straight line which is a straight line orthogonal to the third straight line on the predetermined plane. A straight line obtained by translating the fourth straight line from the predetermined plane to the three-dimensional object within the virtual three-dimensional space may be calculated as the second straight line.

According to the above configuration example, the second straight line can be calculated in accordance with the attitude of the three-dimensional object, so that a flexible rotation operation for the three-dimensional object can be provided.

In another configuration example, the information processing program may further cause the computer to execute calculating, on the basis of an input performed with the pointing device, a vector for the input on the predetermined plane, and the calculated vector may be projected to at least one of the third straight line and the fourth straight line, and one of the first straight line and the second straight line may be selected on the basis of a length of the projected vector on the straight line. Further, the calculated vector may be projected to both the third straight line and the fourth straight line, and one of the first straight line and the second straight line may be selected on the basis of the straight line on which the length of the projected vector is shorter. Moreover, when the straight line on which the length of the vector is shorter is the third straight line, the first straight line may be selected, and when the straight line on which the length of the vector is shorter is the fourth straight line, the second straight line may be selected.

According to the above configuration example, in rotating the three-dimensional object, rotation that provides a less feeling of discomfort with respect to the content of an operation of a user can be performed.

In another configuration example, the information processing program may further cause the computer to execute: calculating, on the basis of an input performed with the pointing device, a vector for the input on a predetermined plane; determining whether a length of a straight line obtained by projecting the first straight line onto the predetermined plane is less than a predetermined value; and calculating a fifth straight line which is a straight line orthogonal to a direction of the calculated vector. When it is determined that the length of the projected straight line is less than the predetermined value, a straight line obtained by translating the fifth straight line to the three-dimensional object within the virtual three-dimensional space may be calculated as the second straight line, and the second straight line may be selected as a rotation axis.

According to the above configuration example, operability regarding rotation of the three-dimensional object can be enhanced, and appropriate rotation that provides a less feeling of discomfort with respect to the content of an operation of the user can be performed.

In another configuration example, the predetermined plane may be a display surface or a surface parallel to the display surface, and the pointing device may include a touch panel.

According to the above configuration example, intuitive operability can be provided, and appropriate rotation with respect to the content of an operation can be performed.

In another configuration example, the information processing program may further cause the computer to execute rotating the three-dimensional object about a predetermined one axis in a world coordinate system of the virtual three-dimensional space in accordance with an input performed with the pointing device.

According to the above configuration example, the attitude of the three-dimensional object can be changed more freely, and appropriate rotation corresponding to the attitude at each time can be performed.

In another configuration example, a rotation amount may be calculated on the basis of the input performed with the pointing device, and the three-dimensional object may be rotated in accordance with the rotation amount.

According to the above configuration example, both a rotation axis and a rotation amount for the three-dimensional object can be determined, for example, on the basis of a single swipe operation, so that the operability can be enhanced further.

According to the present embodiment, regarding an operation for rotating the three-dimensional object, more intuitive operability that provides a less feeling of discomfort can be provided.

DETAILED DESCRIPTION OF NON-LIMITING EXAMPLE EMBODIMENTS

Hereinafter, an exemplary embodiment will be described.

In the present embodiment, a portable smart device (hereinafter, referred to merely as smart device) capable of a touch operation, such as a smartphone, is assumed as an example of a display processing apparatus. In the present embodiment, a three-dimensional object is displayed on a screen of the smart device. Then, a process of rotating the three-dimensional object in accordance with an operation (specifically, a swipe operation) on a touch panel is performed.

Figure 1:
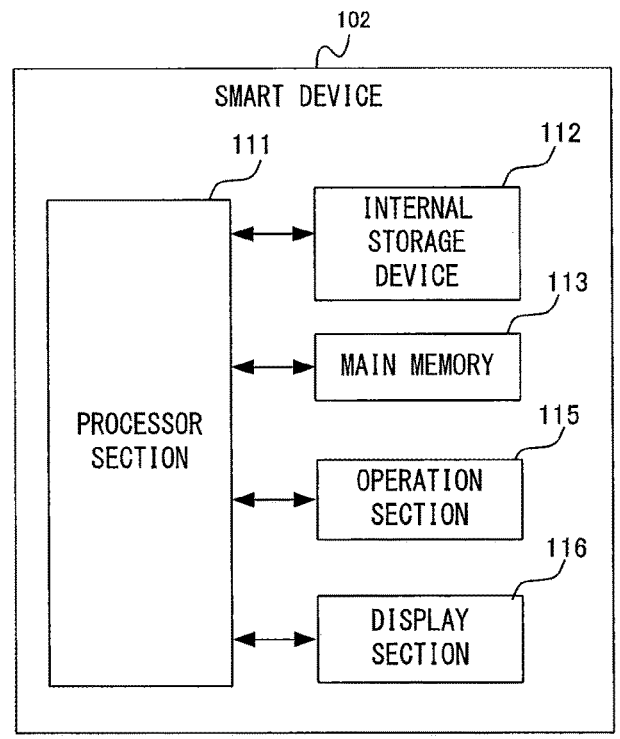
FIG. 1 is a block diagram showing a non-limiting example of a smart device 102.

First, the hardware configuration of the smart device according to the present embodiment will be described. FIG. 1 is a functional block diagram of the smart device 102. In FIG. 1, the smart device 102 includes a processor section 111, an internal storage device 112, a main memory 113, an operation section 115, and a display section 116. The processor section 111 executes later-described information processing and executes a system program (not shown) for controlling overall operation of the smart device 102, thereby controlling operation of the smart device 102. The processor section 111 may include a single processor or a plurality of processors. The internal storage device 112 stores therein various programs to be executed by the processor section 111, and various kinds of data to be used in the programs. The internal storage device 112 is, for example, a flash EEPROM or a hard disk device. The main memory 113 temporarily stores therein computer programs and information. The operation section 115 is, for example, an input device for receiving an operation from a user. The display section 116 is typically a liquid crystal display unit. In processing according to the present embodiment, a touch panel integrated with a liquid crystal screen is assumed as the operation section 115 and the display section 116. In another embodiment, a predetermined pointing device (e.g., a touch pad, a trackball, etc.) other than a touch panel may be used as the operation section 115.

Figure 2:
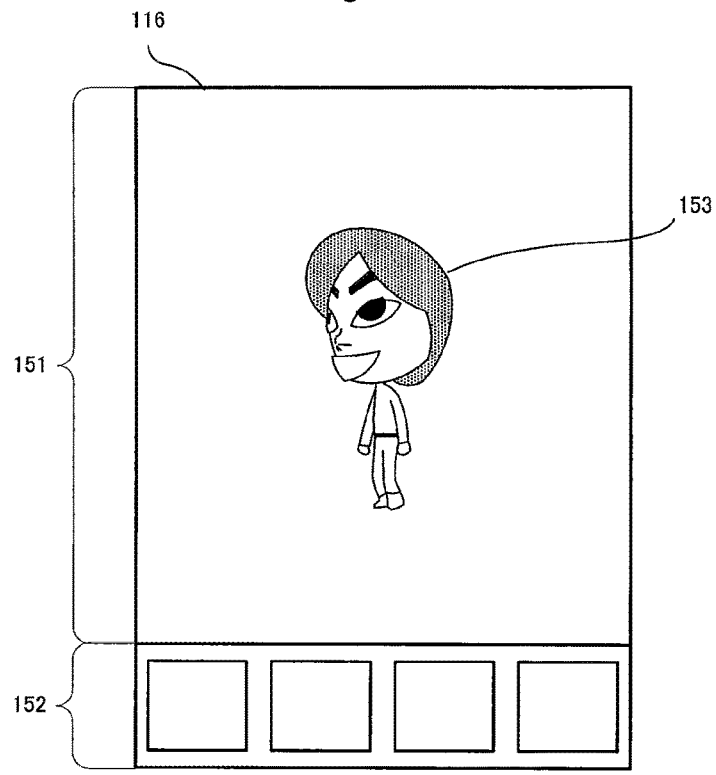
FIG. 2 is a non-limiting screen example of processing according to an exemplary embodiment.

Next, an operation outline of information processing according to the present embodiment will be described. FIG. 2 is a diagram showing a screen example of the processing according to the present embodiment. In FIG. 2, a 3D model display area 151 and a menu display area 152 are displayed on the display section 116. The menu display area 152 is an area in order for the user to issue various commands for, for example, loading or saving data of a three-dimensional object 153 or editing the three-dimensional object 153. The 3D model display area 151 is an area for displaying a virtual three-dimensional space image in which the three-dimensional object 153 is present. In the present embodiment, a human object (avatar object) is shown as an example of the three-dimensional object 153. In the present embodiment, a predetermined process with respect to the three-dimensional object 153 is executed on the basis of a touch operation performed on the 3D model display area 151. Specifically, in the present embodiment, in accordance with a swipe operation on the 3D model display area 151, the three-dimensional object 153 can be rotated (hereinafter, a first rotation process).

Figure 3:
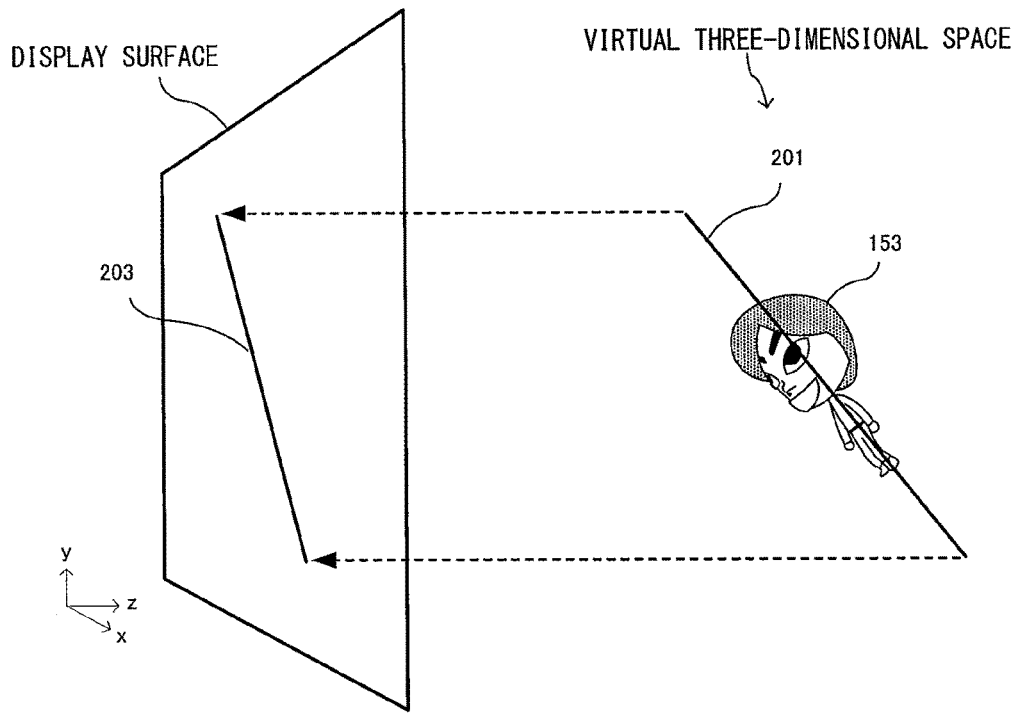
FIG. 3 is a diagram for explaining the principle of a first rotation process.

Here, the principle of the first rotation process according to the present embodiment will be described with reference to FIGS. 3 to 7. First, as shown in FIG. 3, a first straight line 201 passing through predetermined two points in the three-dimensional object 153 within the virtual three-dimensional space is calculated. In the example of FIG. 3, the first straight line 201 is shown as a straight line connecting the parietal region and the foot (heel) of the three-dimensional object 153 in the virtual three-dimensional space. The two points are not limited to those in the example of FIG. 3, and may be any two points.

Next, a second straight line 202 which is a straight line orthogonal to the first straight line 201 is calculated. The second straight line 202 is calculated as follows. First, as shown in FIG. 3, a third straight line 203 obtained by projecting the first straight line 201 onto a predetermined plane is calculated. In the present embodiment, the predetermined plane is assumed as a display surface (i.e., a plane corresponding to a display screen). In another embodiment, the predetermined plane may be a surface parallel to the display surface.

Figure 4:
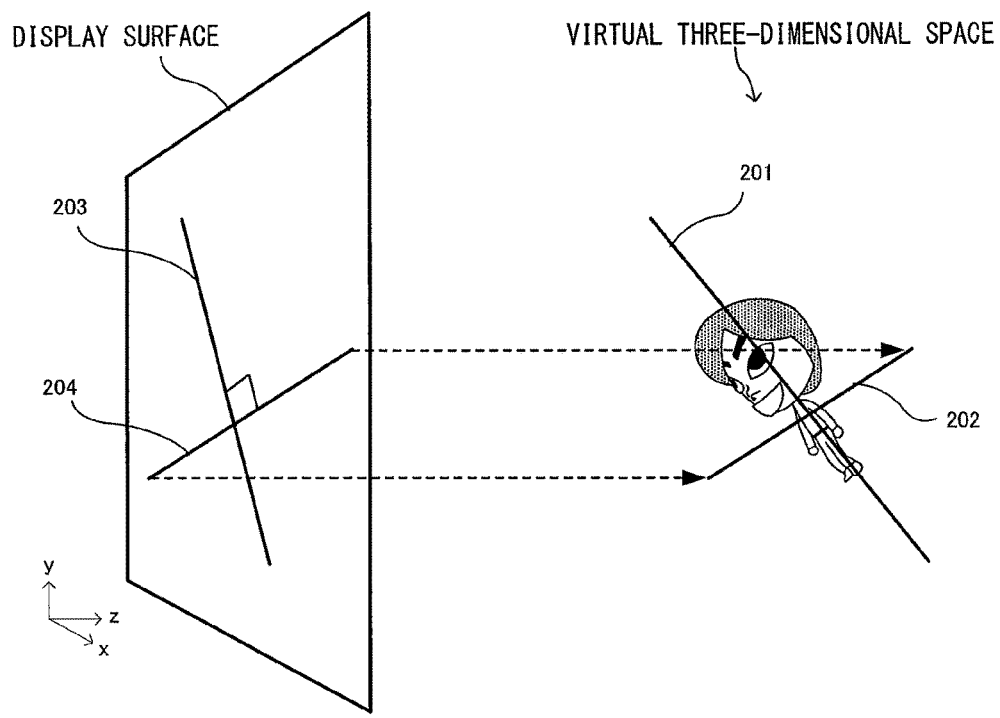
FIG. 4 is a diagram for explaining the principle of the first rotation process.

Next, as shown in FIG. 4, a fourth straight line 204 orthogonal to the third straight line 203 on the display surface is calculated. Then, a straight line obtained by translating the fourth straight line 204 to the central point of the three-dimensional object 153 within the virtual three-dimensional space is calculated as the second straight line 202. In another embodiment, the fourth straight line 204 may be translated to a position slightly shifted from the central point of the three-dimensional object 153, not exactly to the central point of the three-dimensional object 153, or may be translated to an optional position that is not the central point, for example, to the central point of the head of the three-dimensional object 153.

Figure 5:
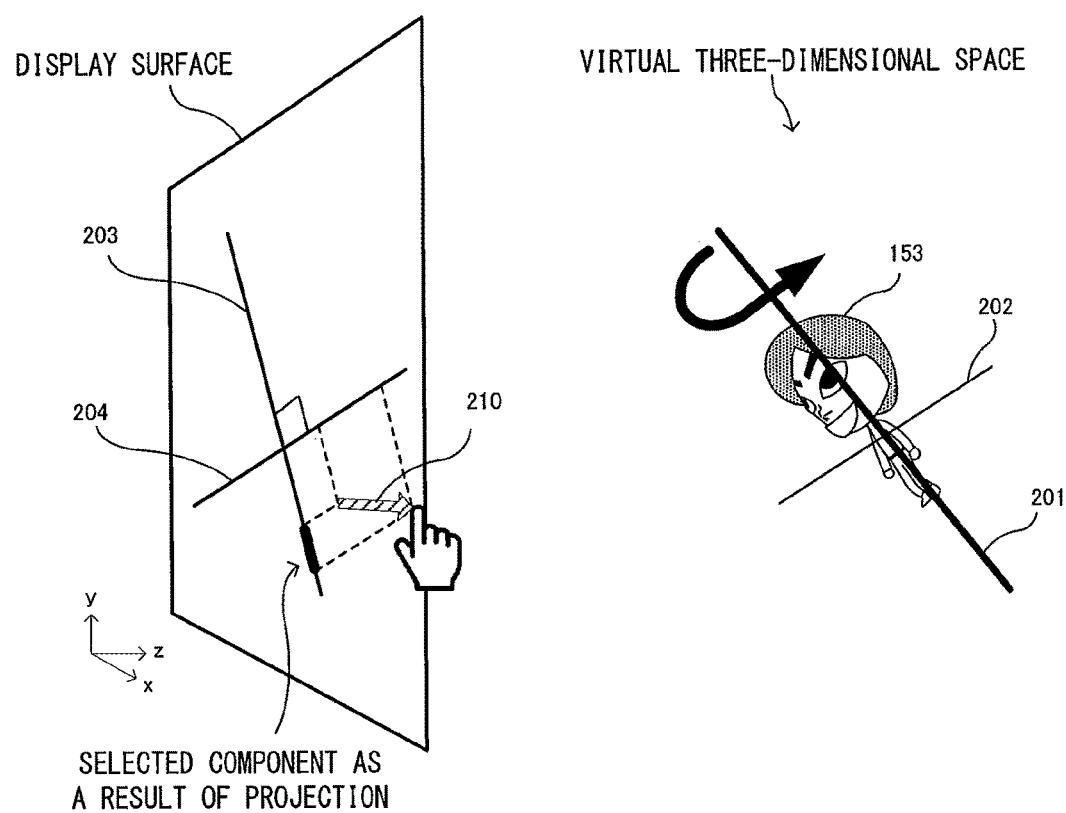
FIG. 5 is a diagram for explaining the principle of the first rotation process.

Then, in the first rotation process, either the first straight line 201 or the second straight line 202 is selected as a rotation axis. Specifically, either the first straight line 201 or the second straight line 202 is selected as follows. First, as shown in FIG. 5, a vector 210 for a swipe operation performed by the user (hereinafter, referred to as a swipe vector) is calculated. Next, the swipe vector 210 is projected to the third straight line 203 and the fourth straight line 204. As a result of the projection, it is determined which of a component corresponding to the third straight line 203 and a component corresponding to the fourth straight line 204 is shorter. Then, of the third straight line 203 and the fourth straight line 204, either one straight line corresponding to the shorter component is selected. In the example of FIG. 5, the third straight line 203 is selected.

Next, of the first straight line 201 and the second straight line 202, the straight line corresponding to the selected straight line is selected as a rotation axis. That is, when the straight line selected as a result of the project is the third straight line 203, the first straight line 201 is selected as a rotation axis. In addition, when the straight line selected as a result of the project is the fourth straight line 204, the second straight line 202 is selected as a rotation axis. In the example of FIG. 5, the first straight line 201 is selected as a rotation axis.

Then, a process of rotating the three-dimensional object 153 about the selected rotation axis in accordance with the swipe direction and the swipe distance (swipe amount) of the swipe vector 210, is performed.

Figure 6:
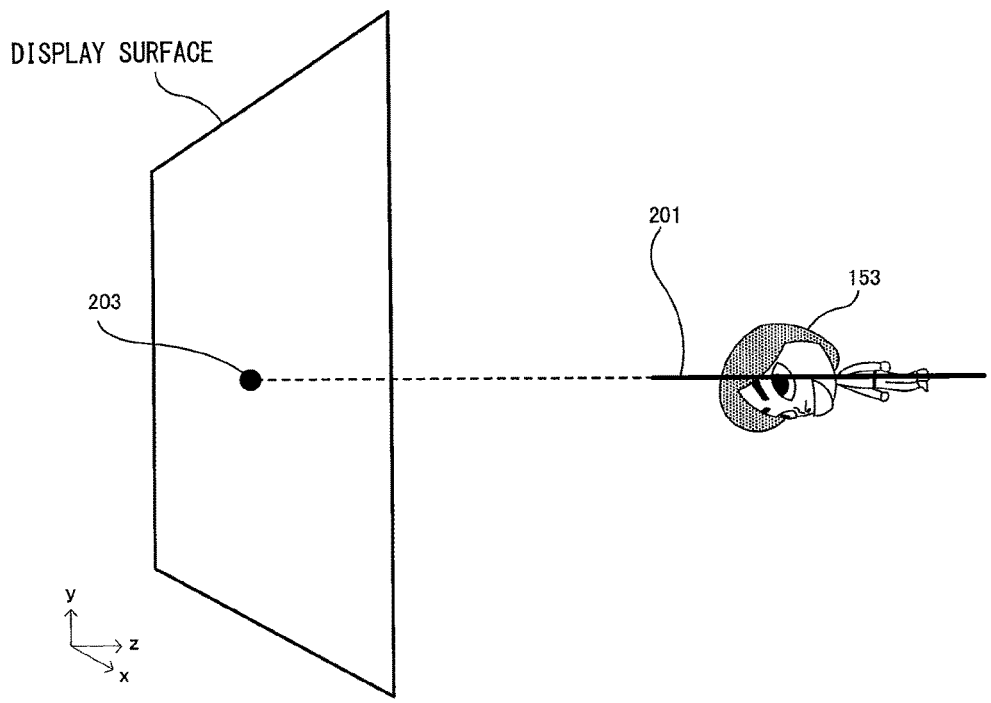
FIG. 6 is a diagram for explaining the principle of the first rotation process.
Figure 7:
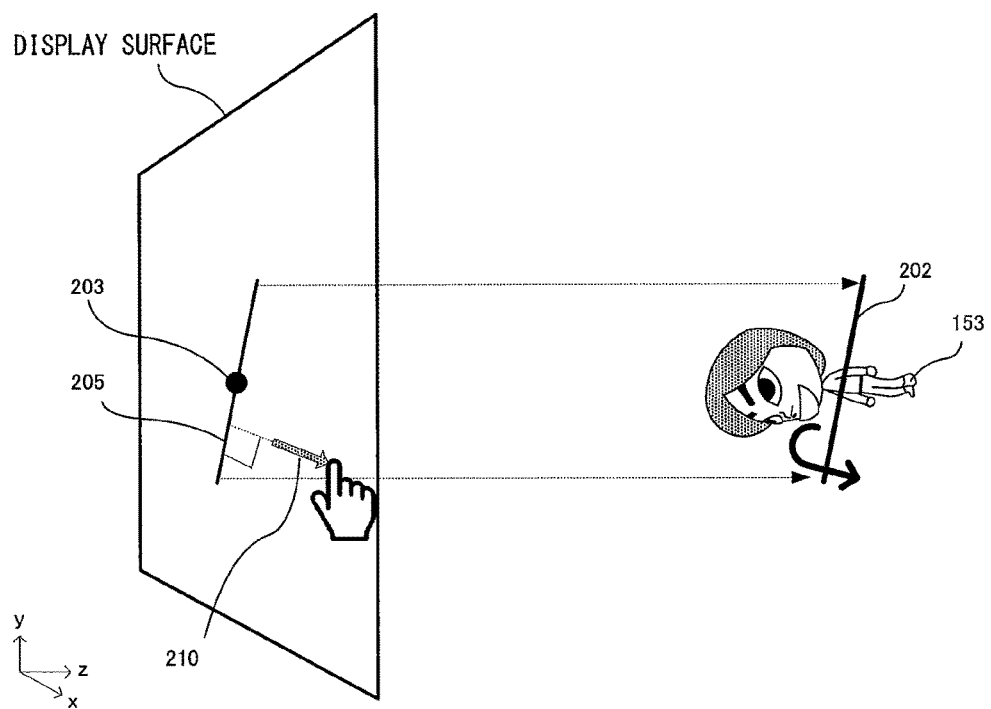
FIG. 7 is a diagram for explaining the principle of the first rotation process.

Meanwhile, it is conceivable that, as shown in FIG. 6, when the attitude of the three-dimensional object 153 comes close to an attitude in which the three-dimensional object 153 is orthogonal to the display surface, the first straight line 201 projected onto the display surface converges to one point. Thus, it is conceivable that it becomes difficult to perform an appropriate rotation process. Therefore, in the present embodiment, in such a case (e.g., when the length of the third straight line 203 is less than a predetermined value), the following process is performed. First, a straight line orthogonal to the swipe vector 210 is calculated, and is set as a fifth straight line 205. Then, similarly to the case of the fourth straight line, the second straight line 202 is calculated by translating the fifth straight line 205. Then, a process of rotating the three-dimensional object 153 about the second straight line 202 is performed (that is, when the length of the third straight line 203 is less than the predetermined value, the second straight line 202 is constantly set as a rotation axis).

As described above, in the present embodiment, a process of rotating the three-dimensional object 153 by using either the first straight line 201 or the second straight line 202 as a rotation axis on the basis of a swipe operation, is executed. By the execution of the rotation process as described above, an intuitive rotation operation is made possible. In addition, the first straight line 201 and the second straight line 202 change in response to a change in the attitude of the three-dimensional object 153 (that is, are not fixed), so that it is also made possible to perform a flexible rotation operation. In other words, the first rotation process can be said to be a process of rotating the three-dimensional object 153 about an axis based on the three-dimensional object 153.

The first rotation process can be grasped as the following process. For example, a local coordinate system for the three-dimensional object 153 in which the first straight line 201 is a y axis, the second straight line 202 is an x axis, and an axis orthogonal to these axes is a z axis, is considered. Then, with the y axis fixed, the direction of the z axis is caused to coincide with the depth direction (the z axis direction) in a world coordinate system. Then, the x axis is rotated such that the x axis is orthogonal to the y axis and the z axis, thereby derive a local coordinate system for a rotation process. Then, the three-dimensional object 153 is rotated about one of the y axis or the x axis in the local coordinate system for a rotation process.

Next, an operation other than the first rotation process will be described. First, by touching the 3D model display area 151 with two fingers and moving the fingers so as to rotate the fingers in this state, it is possible to rotate the three-dimensional object 153 about an axis extending in the depth direction when the screen is seen from front (hereinafter, a second rotation process). In the present embodiment, the rotation axis used in the first rotation process and the rotation axis used in the second rotation process are different from each other. In other words, the second rotation process can be said to be a process of rotating the three-dimensional object 153 about a predetermined one axis in the world coordinate system of the virtual three-dimensional space (the axis in the depth direction in this example). In addition, by touching the three-dimensional object 153 and performing a drag operation, the three-dimensional object 153 can be moved. Moreover, the three-dimensional object 153 can be reduced or enlarged in accordance with a pinch-in or pinch-out operation.

As described above, it is possible to change the display form of the three-dimensional object even by an operation other than a swipe operation. In particular, since it is possible to change the attitude of the three-dimensional object 153 by a second rotation operation, the above-described process regarding a first rotation operation is effective for making it easy to perform an appropriate operation of rotating the three-dimensional object 153.

Figure 8:
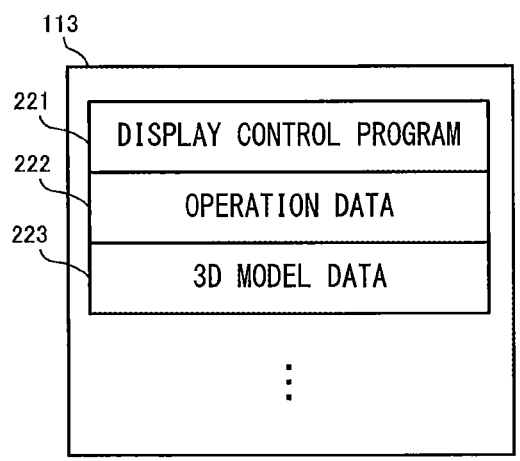
FIG. 8 is a non-limiting example of a program and data stored in a main memory 113 of the smart device 102.
Figure 9:
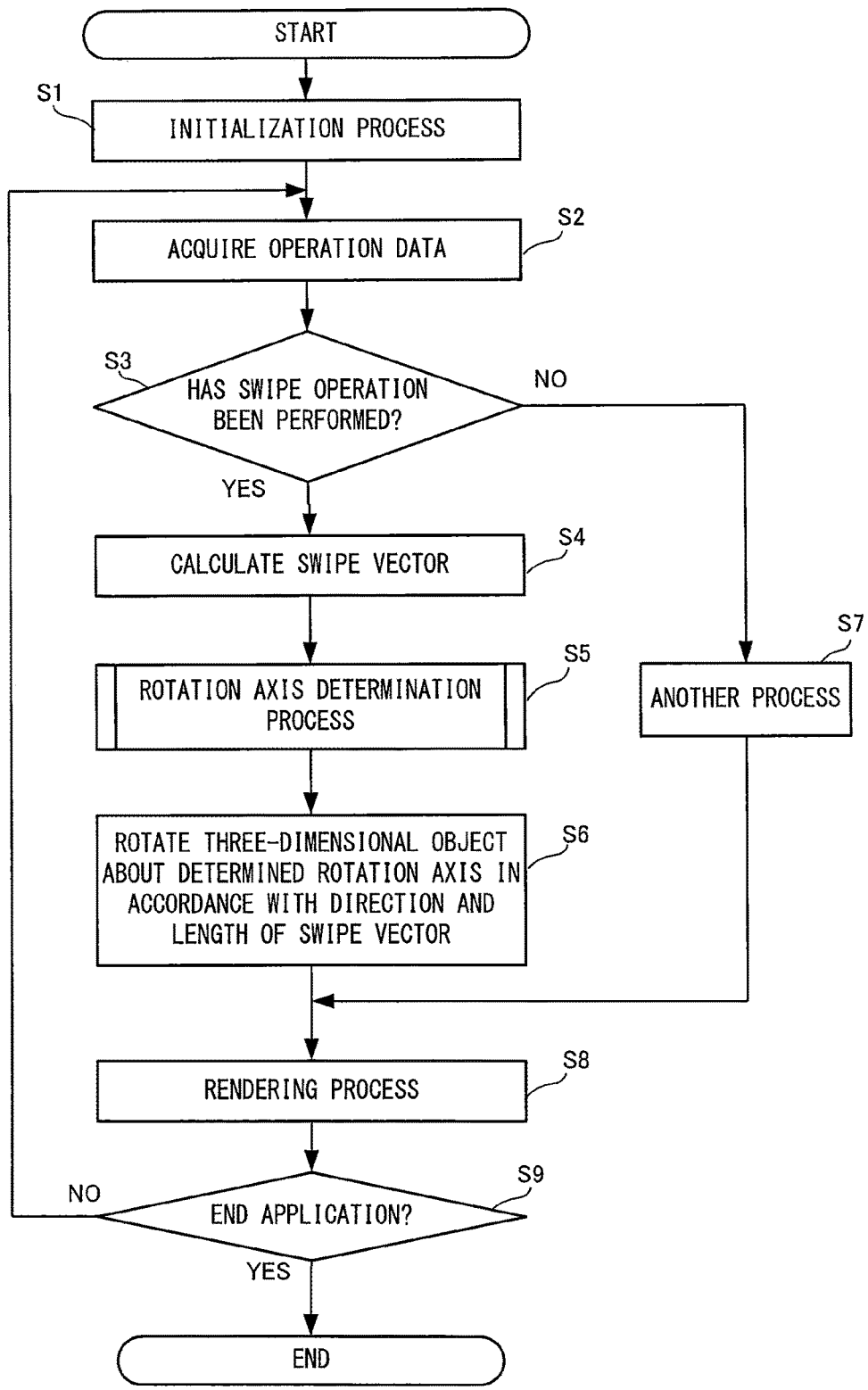
FIG. 9 is a flowchart showing details of the processing according to the exemplary embodiment.

Next, operation of the processing according to the present embodiment will be described in more detail with reference to FIGS. 8 to 10.

First, data used in the processing according to the present embodiment will be described. FIG. 8 shows an example of a program and data stored in the main memory 113 of the smart device 102. A display control program 221, operation data 222, and 3D model data 223, etc. are stored in the main memory 113.

The display control program 221 is a program for executing the rotation processes as described above, and the like. Specifically, the display control program 221 is a program for executing processing in a flowchart of FIG. 9 described later.

The operation data 222 is data indicating the contents of various operations performed on the operation section 115. In the present embodiment, the operation data 222 includes data indicating presence/absence of an input to the touch panel as the operation section 115, a touch coordinate, and the like.

The 3D model data 223 is 3D model data for forming the three-dimensional object 153.

Next, flow of processing executed by the processor section 111 of the smart device 102 will be described with reference to flowcharts FIGS. 10 and 11. A processing loop of steps S2 to S9 in FIG. 10 is executed repeatedly, for example, every 60 frames.

First, when a command for activating an application according to the present embodiment is received, the processor section 111 executes an initialization process in step S1. Specifically, a process of initializing data used in this processing is executed. Furthermore, the three-dimensional object 153 is generated on the basis of the 3D model data 223, and is positioned within the virtual three-dimensional space. In addition, a virtual camera is also positioned within the virtual three-dimensional space. Then, the processor section 111 generates an image obtained by capturing the virtual three-dimensional space with the virtual camera, and displays the generated image in the 3D model display area 151.

Next, in step S2, the processor section 111 acquires the operation data 222. Subsequently, in step S3, on the basis of the operation data 222, the processor section 111 determines whether a swipe operation has been performed on the 3D model display area 151. As a result, when a swipe operation has been performed (YES in step S3), the processor section 111 calculates the above swipe vector for the swipe operation in step S4. Next, in step S5, the processor section 111 executes a rotation axis determination process for determining a rotation axis in the first rotation process.

Figure 10:
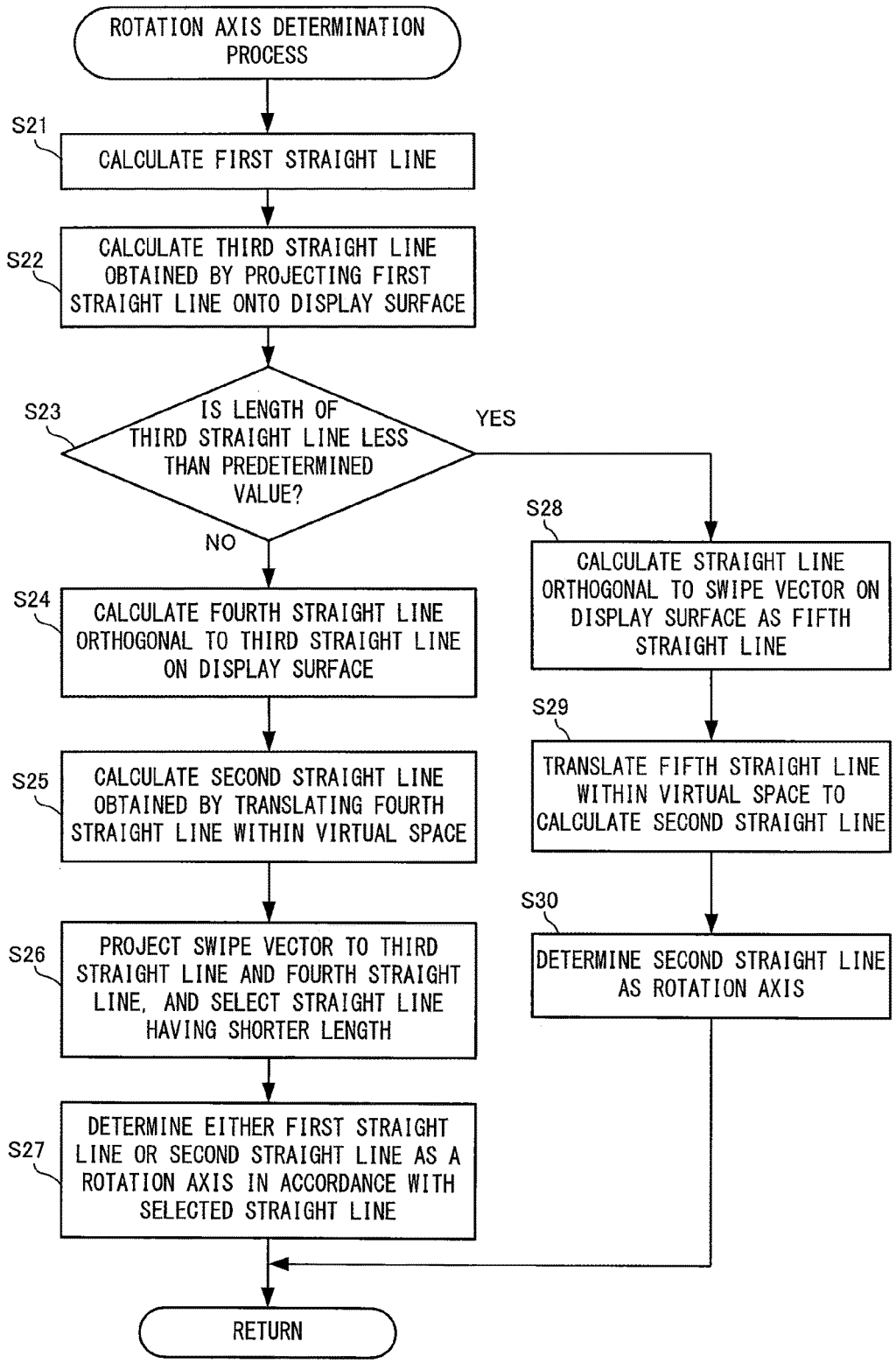
FIG. 10 is a flowchart showing details of a rotation axis determination process in step S5 in FIG. 9.

FIG. 10 is a flowchart showing details of the rotation axis determination process in step S5. In FIG. 10, first, in step S21, the processor section 111 executes a process of calculating the first straight line 201 as described above. For example, a process of calculating a straight line connecting predetermined two points that are predefined for the three-dimensional object 153, is executed.

Next, in step S22, the processor section 111 calculates the third straight line 203 by projecting the first straight line 201 onto the display surface.

Next, in step S23, the processor section 111 determines whether the length of the third straight line 203 is less than a predetermined value. That is, the processor section 111 determines how close the first straight line 201 is to an attitude of being orthogonal to the display surface (see FIG. 6). As a result of the determination, when the length of the third straight line 203 is not less than the predetermined value (NO in step S23), the processor section 111 calculates the fourth straight line 204 orthogonal to the third straight line 203 on the display surface in step S24. Subsequently, in step S25, the processor section 111 calculates, as the second straight line 202, a straight line obtained by translating the fourth straight line 204 to the center of the three-dimensional object 153.

Next, in step S26, the processor section 111 projects the swipe vector to the third straight line 203 and the fourth straight line 204. Then, the processor section 111 compares the length of the component of the swipe vector on the third straight line that is obtained by the projection and the length of the component of the swipe vector on the fourth straight line that is obtained by the projection. Then, the processor section 111 selects the straight line corresponding to the component having a shorter length. In the example of FIG. 5, regarding the swipe vector 210, the component on the third straight line 203 is shorter than the component on the fourth straight line 204. Thus, in the case of this drawing, the third straight line 203 is selected.

As a result of the comparison, when the length of the component of the swipe vector on the third straight line and the length of the component of the swipe vector on the fourth straight line are equal to each other, for example, the straight line that is selected in the processing loop executed last may be selected. Alternatively, when the lengths are equal to each other, either one of the straight lines may be selected fixedly. For example, when the lengths are equal to each other, the third straight line may be selected at every time.

Next, in step S27, the processor section 111 determines, as a rotation axis, either the first straight line 201 or the second straight line 202 corresponding to the selected straight line. When the third straight line 203 has been selected, the first straight line 201 is selected. When the fourth straight line 204 has been selected, the second straight line 202 is selected. Thereafter, the rotation axis determination process ends.

On the other hand, as a result of the determination in step S23, when the length of the third straight line 203 is less than the predetermined value (YES in step S23), the processor section 111 calculates a straight line orthogonal to the swipe vector on the display surface, as the above-described fifth straight line 205 in step S28.

Next, in step S29, the processor section 111 calculates, as the second straight line 202, a straight line obtained by translating the fifth straight line 205 to the center of the three-dimensional object 153.

Subsequently, in step S30, the processor section 111 determines the second straight line calculated in step S29, as a rotation axis. Then, the rotation axis determination process ends.

Referring back to FIG. 9, in step S6 next to the process in step S5, the processor section 111 executes a process of rotating the three-dimensional object 153 about the rotation axis determined in the rotation axis determination process. Specifically, the processor section 111 calculates the direction and the length (distance) of the swipe operation on the basis of the swipe vector. Then, the processor section 111 executes a process of rotating the three-dimensional object 153 about the determined rotation axis by a predetermined amount in accordance with this direction and this length.

On the other hand, as a result of the determination in step S3, when a swipe operation has not been performed (NO in step S3), the processor section 111 executes, in step S7, a predetermined process based on the content of the operation data 222 other than the above process. Specifically, when the operation content indicated by the operation data 222 is a pinch-in or pinch-out operation, the processor section 111 executes a process of reducing or enlarging the three-dimensional object 153 (controlling the position or angle of view of the virtual camera) in accordance with the operation content. When the operation content is an operation of touching and dragging the three-dimensional object 153 (a drag operation being performed while selecting the three-dimensional object 153), the processor section 111 executes a process of moving the currently-selected three-dimensional object 153 within the virtual three-dimensional space in accordance with the direction and the distance of this drag operation. When the operation content corresponds to the second rotation operation, the processor section 111 executes a process of rotating the three-dimensional object 153 about a directional axis in the virtual three-dimensional space corresponding to the depth direction when the display surface is seen from front. That is, the processor section 111 executes a process of rotating the three-dimensional object 153 about an axis in the depth direction within the virtual three-dimensional space. When the operation content is an operation on the menu display area 152, the processor section 111 executes a predetermined process based on the touch position at which this operation is performed.

Next, when the process in step S6 or S7 ends, the processor section 111 executes, in step S8, a process of rendering, on the screen, an image obtained by capturing, with the virtual camera, the three-dimensional virtual space in which the above process has been reflected.

Next, in step S9, the processor section 111 determines whether a condition for ending this processing has been met. When the condition has been met (YES in step S9), the processor section 111 ends the processing. When the condition has not been met (NO in step S9), the processor section 111 returns to step S2 and repeats the above process. This is the end of the detailed description of the display control processing according to the present embodiment.

As described above, in the present embodiment, a rotation process using the first straight line 201 and the second straight line 202 is performed as the first rotation process. In other words, a process using two rotation axes is performed in accordance with a swipe operation. In addition, selection of a rotation axis and an amount of rotation about the rotation axis are determined on the basis of a single swipe operation. Thus, an intuitive rotation operation can be provided to the user. Moreover, since the attitudes of the first straight line 201 and the second straight line 202 within the virtual space change in accordance with the above operation, flexible rotation of the three-dimensional object 153 is also possible.

The two points on the basis of which the first straight line 201 is calculated may be predefined points, or may be freely settable by the user. In addition, in the above example, the "straight lines" such as the first straight line 201 to the fifth straight line 205 are calculated. Instead of these "straight lines", "vectors" may be calculated and processed.

Regarding the process of determining a rotation axis from the first straight line and the second straight line, the swipe vector 210 is projected to both the third straight line 203 and the fourth straight line 204 in the above example. In another embodiment, the swipe vector 210 may be projected to only either one of the third straight line 203 and the fourth straight line 204. For example, the following process may be performed. The swipe vector 210 is projected to only the third straight line 203. Then, when the length of the projected straight line is less than a predetermined value, the first straight line 201 is selected as a rotation axis, and when the length is equal to or greater than the predetermined value, the second straight line 202 is selected as a rotation axis.

In the embodiment described above, the series of processes of the application as described above is performed in the single smart device 102. In another embodiment, the series of processes described above may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses.

While the exemplary embodiments have been described in detail, the foregoing description is in all aspects illustrative and not restrictive. It is understood that numerous other modifications and variations can be devised without departing from the scope of the exemplary embodiments.

What is claimed is:

1. A computer-readable non-transitory storage medium having stored therein an information processing program executed by a computer of an information processing apparatus capable of receiving an input performed with a pointing device, the information processing program causing the computer to execute:
   positioning a three-dimensional object in a virtual three-dimensional space;
   displaying a three-dimensional image obtained by capturing the virtual three-dimensional space with a virtual camera, on a screen;
   calculating a first straight line on the basis of predetermined two points in the three-dimensional object;
   calculating a second straight line orthogonal to the first straight line;
   calculating a third straight line which is a straight line obtained by projecting the first straight line onto a predetermined plane;
   calculating a fourth straight line which is a straight line orthogonal to the third straight line on the predetermined plane, wherein the second straight line is calculated by translating the fourth straight line from the predetermined plane to the three-dimensional object within the virtual three-dimensional space,
   selecting either one of the first straight line and the second straight line as a rotation axis on the basis of an input performed with the pointing device; and
   rotating the three-dimensional object about the selected rotation axis.

2. The computer-readable non-transitory storage medium according to claim 1, wherein
   the information processing program further causes the computer to execute calculating, on the basis of an input performed with the pointing device, a vector for the input on the predetermined plane, and
   the calculated vector is projected to at least one of the third straight line and the fourth straight line, and one of the first straight line and the second straight line is selected on the basis of a length of the projected vector on the straight line.

3. The computer-readable non-transitory storage medium according to claim 2, wherein the calculated vector is projected to both the third straight line and the fourth straight line, and one of the first straight line and the second straight line is selected on the basis of the straight line on which the length of the projected vector is shorter.

4. The computer-readable non-transitory storage medium according to claim 3, wherein,
   when the straight line on which the length of the vector is shorter is the third straight line, the first straight line is selected, and
   when the straight line on which the length of the vector is shorter is the fourth straight line, the second straight line is selected.

5. The computer-readable non-transitory storage medium according to claim 1, wherein
the information processing program further causes the computer to execute:
calculating, on the basis of an input performed with the pointing device, a vector for the input on a predetermined plane;
determining whether a length of a straight line obtained by projecting the first straight line onto the predetermined plane is less than a predetermined value; and
calculating a fifth straight line which is a straight line orthogonal to a direction of the calculated vector, and
when it is determined that the length of the projected straight line is less than the predetermined value, wherein the second straight line is calculated by translating the fifth straight line to the three-dimensional object within the virtual three-dimensional space, and the second straight line is selected as a rotation axis.

6. The computer-readable non-transitory storage medium according to claim 1, wherein the predetermined plane is a display surface or a surface parallel to the display surface.

7. The computer-readable non-transitory storage medium according to claim 1, wherein the pointing device includes a touch panel.

8. The computer-readable non-transitory storage medium according to claim 1, wherein the information processing program further causes the computer to execute rotating the three-dimensional object about a predetermined one axis in a world coordinate system of the virtual three-dimensional space in accordance with an input performed with the pointing device.

9. The computer-readable non-transitory storage medium according to claim 1, wherein a rotation amount is calculated on the basis of the input performed with the pointing device, and the three-dimensional object is rotated in accordance with the rotation amount.

10. An information processing system capable of receiving an input performed with a pointing device, the information processing system including a processor configured to:
position a three-dimensional object in a virtual three-dimensional space;
display a three-dimensional image obtained by capturing the virtual three-dimensional space with a virtual camera, on a screen;
calculate a first straight line on the basis of predetermined two points in the three-dimensional object;
calculate a second straight line orthogonal to the first straight line;
calculate a third straight line which is a straight line obtained by projecting the first straight line onto a predetermined plane;
calculate a fourth straight line which is a straight line orthogonal to the third straight line on the predetermined plane, wherein the second straight line is calculated by translating the fourth straight line from the predetermined plane to the three-dimensional object within the virtual three-dimensional space;
select either one of the first straight line and the second straight line as a rotation axis on the basis of an input performed with the pointing device; and
rotate the three-dimensional object about the selected rotation axis.

11. The information processing system according to claim 10, wherein:
the processor is further configured to calculate, on the basis of an input performed with the pointing device, a vector for the input on the predetermined plane,
the calculated vector is projected to at least one of the third straight line and the fourth straight line, and one of the first straight line and the second straight line is selected on the basis of a length of the projected vector on the straight line.

12. The information processing system according to claim 10, wherein:
the processor is further configured to:
calculate, on the basis of an input performed with the pointing device, a vector for the input on a predetermined plane;
determine whether a length of a straight line obtained by projecting the first straight line onto the predetermined plane is less than a predetermined value; and
calculate a fifth straight line which is a straight line orthogonal to a direction of the calculated vector, and
when it is determined that the length of the projected straight line is less than the predetermined value, the second straight line is calculated by translating the fifth straight line to the three-dimensional object within the virtual three-dimensional space, and the second straight line is selected as a rotation axis.

13. An information processing method for controlling a computer of an information processing apparatus capable of receiving an input performed with a pointing device, the information processing method comprising causing the computer to execute:
positioning a three-dimensional object in a virtual three-dimensional space;
displaying a three-dimensional image obtained by capturing the virtual three-dimensional space with a virtual camera, on a screen;
calculating a first straight line on the basis of predetermined two points in the three-dimensional object;
calculating a second straight line orthogonal to the first straight line;
calculating a third straight line which is a straight line obtained by projecting the first straight line onto a predetermined plane;
calculating a fourth straight line which is a straight line orthogonal to the third straight line on the predetermined plane, wherein the second straight-line is calculated by translating the fourth straight line from the predetermined plane to the three-dimensional object within the virtual three-dimensional space;
selecting either one of the first straight line and the second straight line as a rotation axis on the basis of an input performed with the pointing device; and
rotating the three-dimensional object about the selected rotation axis.

14. The information processing method according to claim 13, wherein:
the method further comprises calculating, on the basis of an input performed with the pointing device, a vector for the input on the predetermined plane, and
the calculated vector is projected to at least one of the third straight line and the fourth straight line, and one of the first straight line and the second straight line is selected on the basis of a length of the projected vector on the straight line.

15. The information processing method according to claim 13, wherein:
the method further comprises:

calculating, on the basis of an input performed with the pointing device, a vector for the input on a predetermined plane;

determining whether a length of a straight line obtained by projecting the first straight line onto the predetermined plane is less than a predetermined value; and calculating a fifth straight line which is a straight line orthogonal to a direction of the calculated vector, and when it is determined that the length of the projected straight line is less than the predetermined value, the second straight line is calculated by translating the fifth straight line to the three-dimensional object within the virtual three-dimensional space, and the second straight line is selected as a rotation axis.

* * * * *